US009970469B2

(12) United States Patent
Pinheiro et al.

(10) Patent No.: US 9,970,469 B2
(45) Date of Patent: May 15, 2018

(54) ASYMMETRIC FASTENER RECESS AND KEY

(71) Applicant: ALCOA INC., Pittsburgh, PA (US)

(72) Inventors: Rodrigo Pinheiro, Riverside, CA (US); Luke Haylock, Culver City, CA (US)

(73) Assignee: Arconic Inc., Pittsburgh, PA (US)

( * ) Notice: Subject to any disclaimer, the term of this patent is extended or adjusted under 35 U.S.C. 154(b) by 321 days.

(21) Appl. No.: 14/503,582

(22) Filed: Oct. 1, 2014

(65) Prior Publication Data
US 2015/0093212 A1    Apr. 2, 2015

Related U.S. Application Data

(60) Provisional application No. 61/885,227, filed on Oct. 1, 2013.

(51) Int. Cl.
*F16B 23/00*    (2006.01)
*F16B 35/04*    (2006.01)

(52) U.S. Cl.
CPC .......... *F16B 23/003* (2013.01); *F16B 35/045* (2013.01)

(58) Field of Classification Search
CPC ....... B25B 13/06; B25B 15/008; B25B 31/00; F16B 23/0023; F16B 23/003; F16B 37/045; F16B 35/045
See application file for complete search history.

(56) References Cited

U.S. PATENT DOCUMENTS

| 2,285,460 | A |   | 6/1942  | Purtell |              |
|-----------|---|---|---------|---------|--------------|
| 3,481,243 | A | * | 12/1969 | Gatz    | F16B 23/0007 |
|           |   |   |         |         | 411/404      |
| 5,449,260 | A |   | 9/1995  | Whittle |              |
| 5,957,645 | A |   | 9/1999  | Stacy   |              |
| 6,199,455 | B1| * | 3/2001  | Wagner  | F16B 23/0007 |
|           |   |   |         |         | 81/121.1     |
| 6,223,634 | B1|   | 5/2001  | Hughes et al. |        |
| 6,237,450 | B1| * | 5/2001  | Cosenza | B25B 15/005  |
|           |   |   |         |         | 81/436       |
| 6,601,482 | B2|   | 8/2003  | Hughes et al. |        |

(Continued)

FOREIGN PATENT DOCUMENTS

CN    1287034 A    3/2001
CN  101309779 A   11/2008

(Continued)

OTHER PUBLICATIONS

International Search Report and Written Opinion issued by the European Patent Office dated Jan. 8, 2015 in International (PCT) Application No. PCT/US2014/058551 (12 pages).

*Primary Examiner* — Robert Scruggs

(74) *Attorney, Agent, or Firm* — Greenberg Traurig, LLP

(57) ABSTRACT

A fastening system including a pin member and a key for engaging the pin member. The pin member includes a shank portion and a recess formed within an end face of the shank portion. The recess includes a plurality of splines and recesses that form first and second bearing surfaces oriented at angles. The key includes a key head having a plurality of splines and grooves that form first and second bearing surfaces oriented at angles. The plurality of splines and recesses of the pin member and the plurality of splines and recesses of the key are adapted to communicate with each other when tightening and loosening the pin member.

36 Claims, 8 Drawing Sheets

(56) References Cited

U.S. PATENT DOCUMENTS

| | | | |
|---|---|---|---|
| 6,698,315 B1 * | 3/2004 | Wright | B25B 13/065 |
| | | | 81/121.1 |
| 6,698,316 B1 | 3/2004 | Wright | |
| 6,725,746 B1 | 4/2004 | Wright | |
| 6,786,827 B2 | 9/2004 | Hughes et al. | |
| 6,904,833 B2 | 6/2005 | Wright | |
| 6,957,959 B2 * | 10/2005 | Kumar | A61C 8/0089 |
| | | | 433/141 |
| 7,174,811 B2 | 2/2007 | Wright | |
| 7,484,440 B2 | 2/2009 | Wright | |
| 9,422,965 B2 * | 8/2016 | Campbell, II | F16B 23/003 |
| 2014/0331826 A1 * | 11/2014 | Campbell | F16B 23/003 |
| | | | 81/436 |
| 2015/0266169 A1 | 9/2015 | Campbell, II | |

FOREIGN PATENT DOCUMENTS

| | | |
|---|---|---|
| DE | 10 2005 051 243 A1 | 5/2007 |
| EP | 1 371 453 A2 | 12/2003 |
| EP | 1 071 543 B1 | 11/2004 |
| GB | 2 149 872 A | 6/1985 |
| GB | 2149872 A | 6/1985 |
| GB | 2 445 546 A | 7/2008 |
| GB | 2445546 A | 7/2008 |
| JP | 3114840 U | 9/2005 |
| JP | 2013-014000 | 1/2013 |
| WO | 1999018361 A1 | 4/1999 |
| WO | WO 00/58056 | 10/2000 |

* cited by examiner

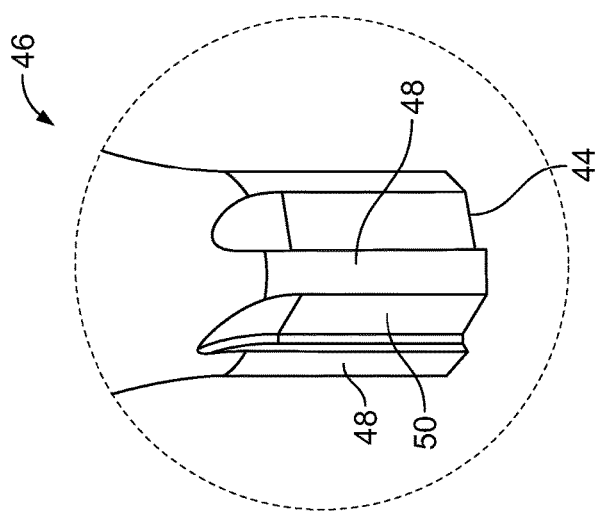
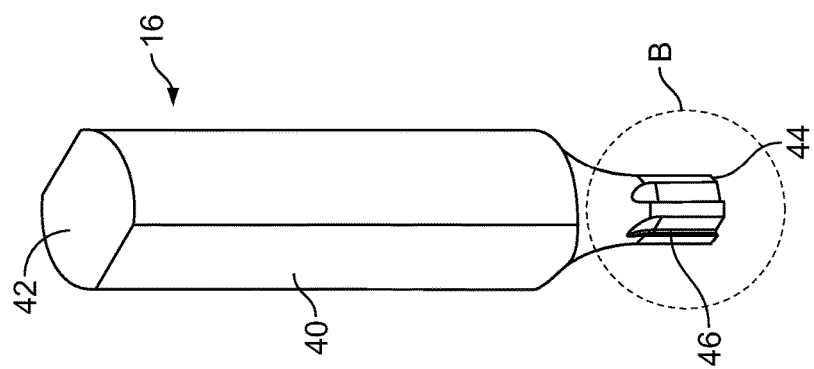
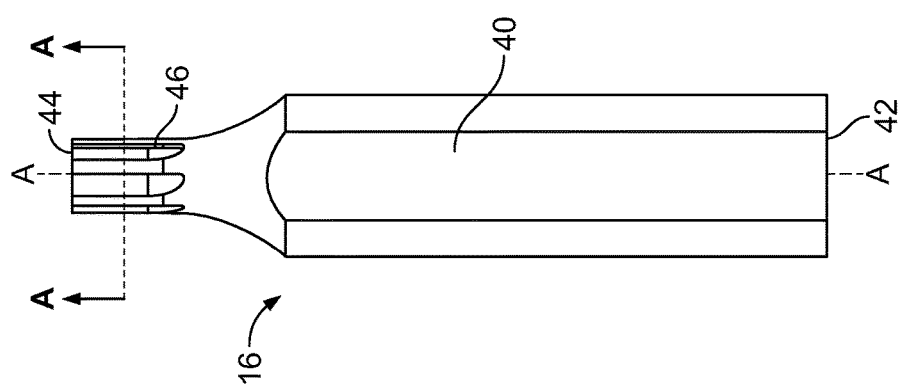

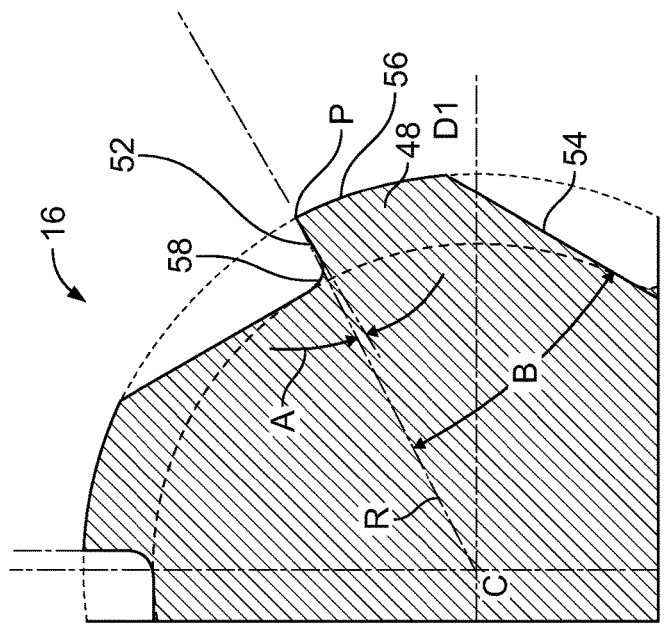
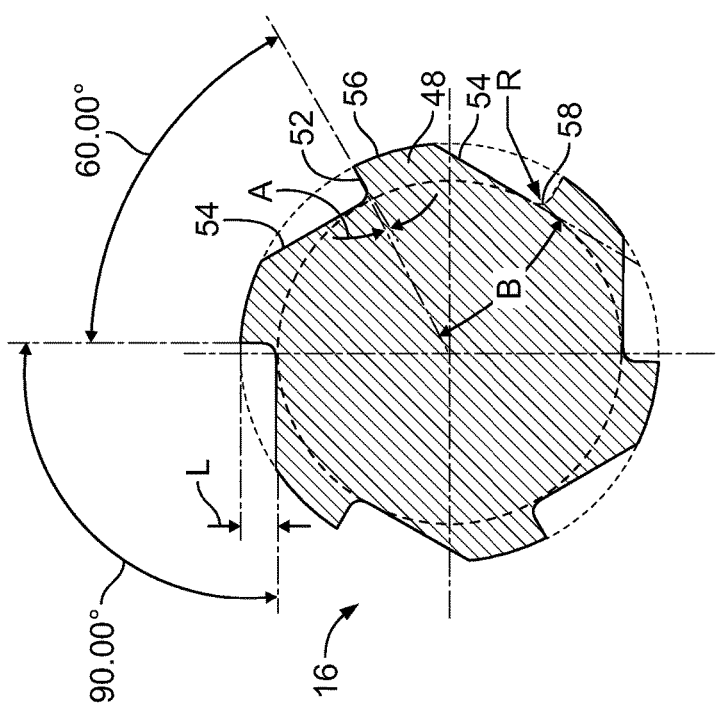

ASYMMETRIC FASTENER RECESS AND KEY

CROSS-REFERENCE TO RELATED APPLICATIONS

This application relates to and claims the benefit of commonly owned, U.S. Provisional Patent Application No. 61/885,227, filed on Oct. 1, 2013, entitled ASYMMETRIC FASTENER RECESS AND KEY, which is incorporated by reference herein in its entirety.

FIELD OF THE INVENTION

The present invention relates to fastener systems, and, more particularly, to a fastener system having a pin member with a spline-drive asymmetric recess for receiving a mating key or tool.

BACKGROUND OF THE INVENTION

Fasteners come in a variety of types, such as threaded pins or bolts, which threadedly receive a nut, or which threadedly engage a bore. Asymmetric fasteners and tools utilize a first set of bearing surfaces for loosening the fastener and a second set of bearing surfaces for tightening the fastener. Problems with existing asymmetric fasteners are high hoop stresses, dilation of the pin member, low bearing strength and shorter life, low torque capabilities, and bearing distortion on the recesses of the fastener.

SUMMARY OF THE INVENTION

In an embodiment, a fastening system includes a pin member including an elongated shank portion having a first end, a second end opposite the first end, a smooth cylindrical shank portion, a threaded portion located at the second end and having a plurality of external threads, and an end face located at the second end and having a recess formed therein, and a head located at the first end, wherein the recess includes a plurality of splines extending axially and positioned circumferentially and equally spaced about a periphery thereof and extending inwardly, each of the plurality of splines includes a first bearing surface and a second bearing surface, wherein the recess includes a plurality of recesses extending axially and formed circumferentially and equally spaced about the periphery, each of the plurality of recesses being located between a corresponding pair of the plurality of splines, wherein each of the first bearing surfaces of each of the plurality of splines of the is oriented at a first angle extending and measured from a radial line that extends from a center point of the elongated shank portion of the pin member to a first point on such first bearing surface located proximate to minor inner diameter of such spline of the pin member in a rotational direction towards the second bearing surface of such spline, wherein each of the second bearing surfaces of each of the plurality of splines is oriented at a second angle extending and measured from the radial line in a rotational direction towards such second bearing surface of such spline; and a key including an elongated shaft having a first end, and a second end opposite the first end of the elongated shaft, and a key head located at the second end of the elongated shaft, wherein the key head includes a plurality of splines extending axially thereon and being equally spaced around a circumference thereof, each of the plurality of splines of the key head having a first bearing surface and a second bearing surface, and wherein the key head includes a plurality of grooves extending axially thereon and being equally spaced around the circumference, each of the plurality of grooves being located between a corresponding pair of the plurality of splines of the key head, wherein each of the first bearing surfaces of each of the plurality of splines of the key head is oriented at a third angle extending and measured from a radial line that extends from a center point of the key to a first point on such first bearing surface of such spline of the key head located proximate to a major outer diameter of such spline of the key head in a rotational direction towards the second bearing surface of such spline of the key head, wherein each of the second bearing surfaces of each of the plurality of splines of the key head is oriented at a fourth angle extending and measured from the radial line of the key head in a rotational direction towards such second bearing surface of such spline of the key head, and wherein the key head of the key is adapted to mate with the recess of the pin member such that each of the first bearing surfaces of each of the plurality of splines of the key head is sized and shaped to engage the first bearing surface of a corresponding one of each of the plurality of splines of the pin member, and each of the second bearing surfaces of each of the plurality of splines of the key head is sized and shaped to engage the second bearing surface of a corresponding one of each of the plurality of splines of the pin member.

In an embodiment, the plurality of splines of the pin member includes six of the splines and wherein the plurality of recesses of the pin member includes six of the recesses, and wherein the plurality of splines of the key includes six of the splines and the plurality of grooves of the key includes six of the grooves. In an embodiment, the first angle and the third angle are each within a range of about 1° to about 5°. In an embodiment, the second angle and the fourth angle are each within a range of about 30° to about 35°.

In an embodiment, the plurality of splines of the pin member includes eight of the splines and wherein the plurality of recesses of the pin member includes eight of the recesses, and wherein the plurality of splines of the key includes eight of the splines and the plurality of grooves of the key includes eight of the grooves. In an embodiment, the first angle and the third angle are each within a range of about 1° to about 5°. In an embodiment, the second angle and the fourth angle are each within a range of about 40° to about 50°. In an embodiment, a corresponding pair of the first bearing surface and the second bearing surface of each of the plurality of splines of the pin member are perpendicular to one another, and wherein a corresponding pair of the first bearing and the second bearing surface of each of the plurality of splines of the key are perpendicular to one another.

In an embodiment, the fastening system includes a nut adapted to engage threadedly the threaded portion of the pin member. In an embodiment, the nut includes a centrally-located bore that is sized and shaped to receive the key therethrough.

BRIEF DESCRIPTION OF THE DRAWINGS

FIGS. 3 and 4 are side elevational and perspective views, respectively, of a fastener key employed by the fastener system shown in FIG. 1;

FIG. 5 is a perspective view of Detail B of FIG. 4;

FIG. 6A is a cross-sectional view, taken along line A-A and looking in the direction of the arrows, of the fastener key shown in FIG. 3;

FIG. 6B is an enlarged view of a portion of the fastener key shown in FIG. 6A;

DETAILED DESCRIPTION OF THE DRAWINGS

Figure 1:
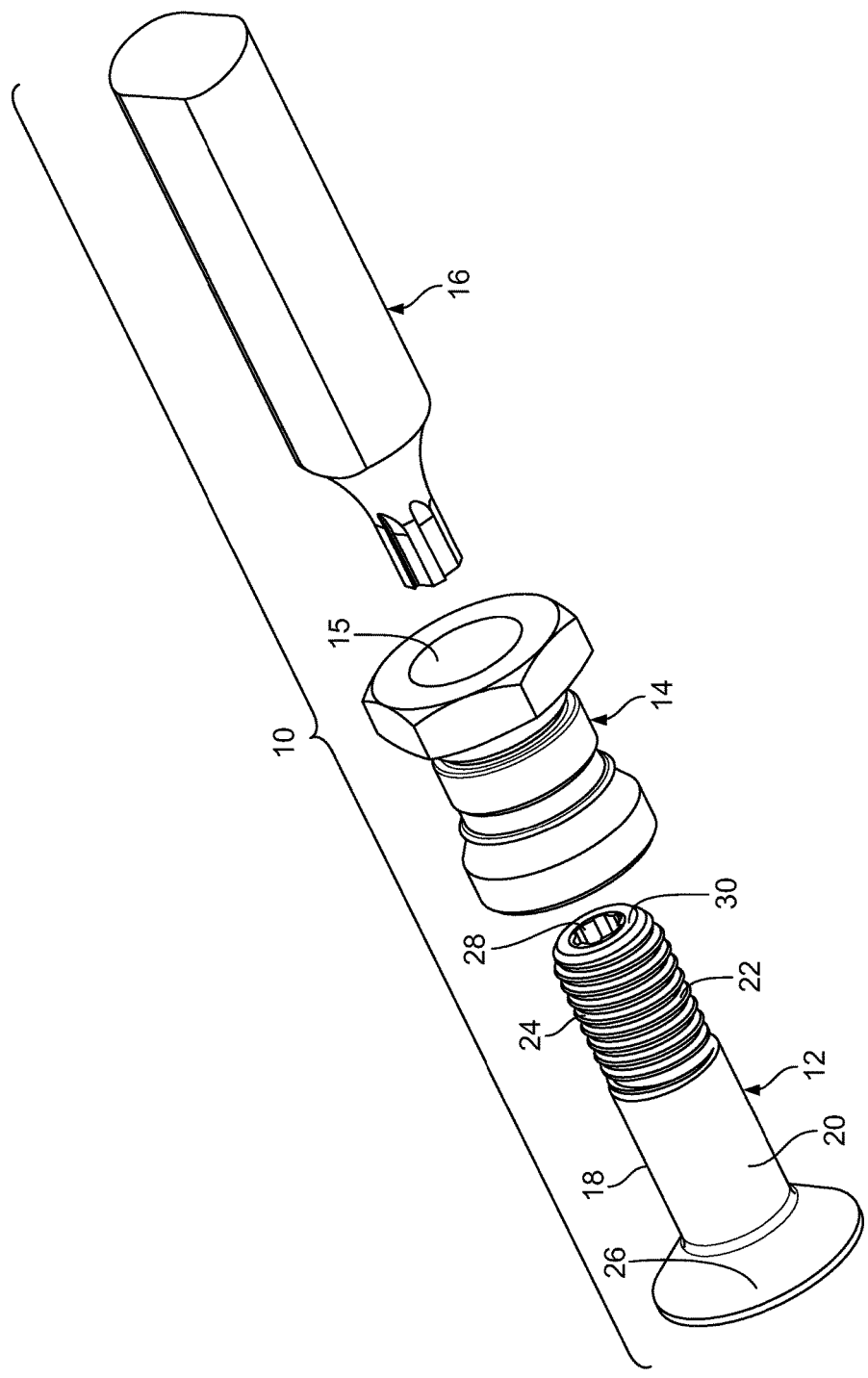
FIG. 1 is a perspective view of a fastening system in accordance with an embodiment.

Referring to FIG. 1, in an embodiment, a fastening system 10 includes a bolt or pin member 12 (hereinafter, "pin member 12"), a nut 14, and a fastener installation tool or fastener key 16 (hereinafter, "key 16"). In an embodiment, the pin member 12 is a shear pin. In an embodiment, the pin member 12 includes an elongated shank portion 18 having a smooth cylindrical shank portion 20 and a threaded portion 22 having a plurality of external threads 24. In an embodiment, the pin member 12 includes a head 26 at one end and a centrally located internal wrench cavity or recess 28 formed axially within an end face 30 of the threaded portion 22 at an opposite end. In an embodiment, the nut 14 includes a centrally-located bore 15 that is sized and shaped to receive the key 16 therein. In an embodiment, the nut 14 includes a plurality of internal threads that threadedly engages the external threads 24 of the pin member 12. In an embodiment, the fastening system 10 is adapted to secure a plurality of work pieces to one another by compressive engagement between the nut 14 on one side of one of the work pieces and the head 26 of the pin member 12 on an opposite side of another of the work pieces when the nut 14 is torqued onto the pin member 12. As will be discussed in further detail below, the recess 28 of the pin member 12 is sized, shaped, and adapted to mate with and receive the key 16, which holds the pin member 12 stationary while a driver turns the nut 14. In an embodiment, the recess 28 reacts to the torque translated onto the pin member 12 when tightening the nut 14. In another embodiment, the recess 28 may be formed within the top of the head 26 of the pin member 12 (not shown in the Figures).

Figure 2:
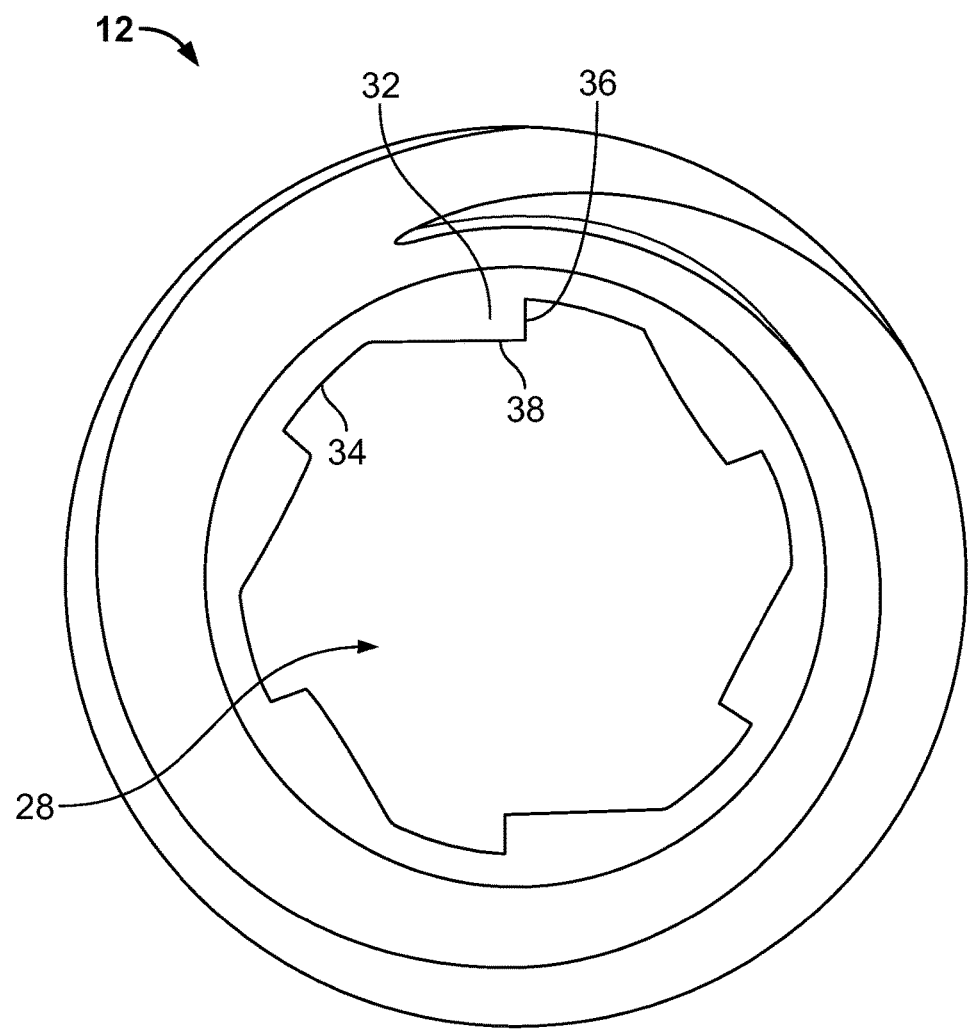
FIG. 2 is a bottom plan view of a pin member employed by the fastener system shown in FIG. 1.

Referring to FIG. 2, the recess 28 includes a plurality of splines 32 positioned circumferentially and equally spaced about a periphery thereof and extending inwardly, and a plurality of recesses 34 formed circumferentially and equally spaced about the periphery thereof. In an embodiment, the plurality of splines 32 includes six (6) of the splines, while the plurality of recesses 34 includes six (6) of the recesses. In an embodiment, each of the splines 32 includes a first bearing surface 36 (sometimes referred to as a "contact flank" or a "contact area") and a second bearing surface 38. In an embodiment, the first bearing surface 36 and the second bearing surface 38 on each of the splines 32 are substantially perpendicular to one another. In an embodiment, each of the first bearing surfaces 36 is parallel to a plane that contains the diametrical centerline of the recess 28, and the first bearing surface 36 is offset from such plane. In an embodiment, the recess 28 is sized and shaped to match that of the geometry of a fastener engagement end of the key 16, which will be described in detail below.

Referring to FIGS. 3 through 5, in an embodiment, the key 16 includes an elongated shaft 40 having a first end 42, a second end 44 opposite the first end 42, and a frusto-conical shaped key head 46 located at the second end 44 of the shaft 40. In an embodiment, referring to FIG. 5, the key head 46 includes a plurality of splines 48 extending axially thereon and equally spaced around the circumference thereof, and a plurality of grooves 50 extending axially thereon and equally spaced around the circumference thereof, each of which is located intermediate two of the splines 48. In an embodiment, the splines 48 and the grooves 50 are parallel to the longitudinal axis A-A of the shaft 40. In an embodiment, the plurality of splines 48 includes six (6) of the splines, while the plurality of grooves 50 includes six (6) of the grooves 50.

Referring to FIGS. 6A and 6B, in an embodiment, each of the splines 48 of the key 16 includes a first bearing surface 52 (or contact flank), a second bearing surface 54, and an outer face 56 which forms a portion of the major outer diameter of the key 16. In an embodiment, the first bearing surface 52 includes a length L (see FIG. 6A). In an embodiment, each of the first bearing surfaces 52 is parallel to a plane that contains the diametrical centerline of the key 16, and the first bearing surface 52 is offset from such plane. In an embodiment, the first bearing surface 52 of one of the splines 48 and the second bearing surface 54 of another of the splines 48 that is positioned proximate and counterclockwise thereto (as shown in FIGS. 6A and 6B) are perpendicular to one another. In an embodiment, the first bearing surface 52 of one of the splines 48 and the second bearing surface 54 of another of the splines 48 positioned proximate and counterclockwise thereto (as shown in FIGS. 6A and 6B) are contiguous by a radiused portion 58.

In an embodiment, and as especially shown in greater detail in FIG. 6B, the first bearing surface 52 of each of the splines 48 is oriented at an Angle A. That is, Angle A is measured from a radial line R that extends from a center point C to a point P on the first bearing surface 52 located proximate to a major outer diameter D1 of such spline 48. In an embodiment, Angle A of the first bearing surface 52 of each of the splines 48 extends and is measured from the radial line R in a rotational direction towards the second bearing surface 54 of such spline 48. Angle A is sometimes referred to as a negative undercut. That is, Angle A of the first bearing surface 52 extends in a direction as that of the preferential direction (e.g., the direction in which the load is applied to the pin member 12 during tightening of the nut 14 thereon). In an embodiment, Angle A is within a range of about 1° to about 5°. In another embodiment, Angle A is about 1°. In another embodiment, Angle A is about 1.5°. In another embodiment, Angle A is about 1.6°. In another embodiment, Angle A is about 1.7°. In another embodiment, Angle A is about 1.8°. In another embodiment, Angle A is about 1.9°. In another embodiment, Angle A is about 2.0°. In another embodiment, Angle A is about 2.1°. In another embodiment, Angle A is about 2.2°. In another embodiment, Angle A is about 2.3°. In another embodiment, Angle A is about 2.4°. In another embodiment, Angle A is about 2.5°. In another embodiment, Angle A is about 2.6°. In another embodiment, Angle A is about 2.7°. In another embodiment, Angle A is about 2.8°. In another embodiment, Angle A is about 2.9°. In another embodiment, Angle A is about 3.0°.

Still referring to FIG. 6B, the second bearing surface 54 of each of the splines 48 is oriented at an Angle B. In an embodiment, Angle B is measured from the radial line R in a rotational direction towards the second bearing surface 54 of such spline 48. In an embodiment, Angle B is within a range of about 30° to about 35°. In another embodiment, Angle B is about 30°. In another embodiment, Angle B is about 30.5°. In another embodiment, Angle B is about 31°. In another embodiment, Angle B is about 31.5°. In another embodiment, Angle B is about 32°. In another embodiment, Angle B is about 32.5°. In another embodiment, Angle B is about 33°. In another embodiment, Angle B is about 33.5°. In another embodiment, Angle B is about 34°. In another embodiment, Angle B is about 34.5°. In another embodiment, Angle B is about 35°.

In an embodiment, as mentioned above, the recess 28 of the pin member 12 (i.e., the splines 32 and the recesses 34) includes a geometry that is the same as (or is substantially similar to) the geometry of the key head 46 at the second end 44, as described above. In an embodiment, the recess 28 of the pin member 12 is sized and shaped to mate with and accommodate receipt of the key head 46 of the key 16 with necessary clearances and tolerances in order for the key 16 to engage the pin member 12.

Figure 8:
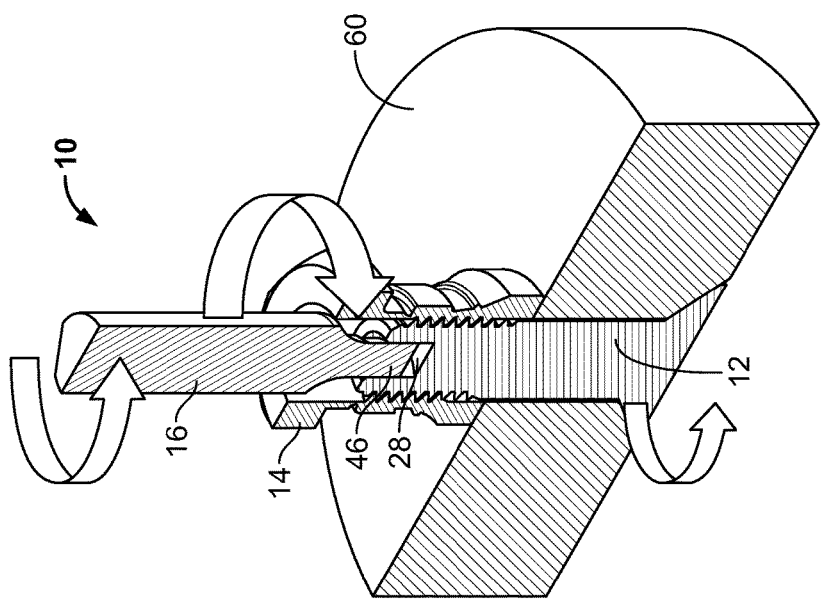
FIG. 8 is a cross-sectional view of the fastening system shown in FIG. 1 with the pin member and the nut engaging a work piece.
Figure 7:
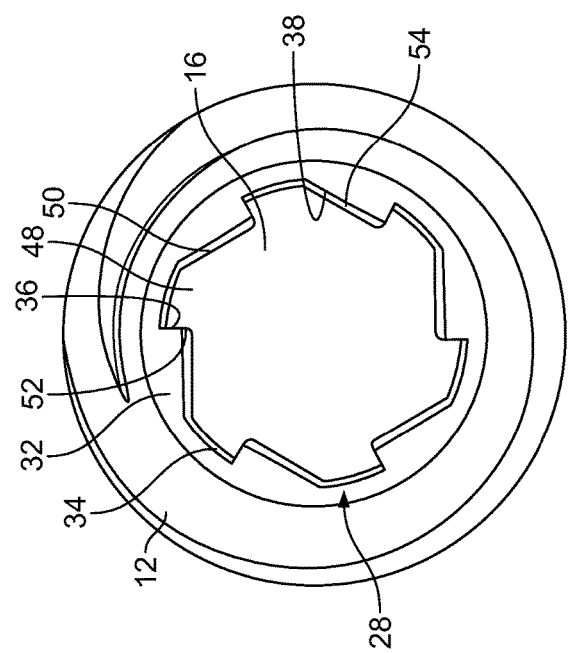
FIG. 7 is a bottom plan view of the pin member shown in FIG. 2 with a cross-section of the key shown in FIGS. 3 through 6B engaging the pin member.

Referring to FIGS. 7 and 8, in an embodiment, when the pin member 12 and the nut 14 are set on a work piece 60 (FIG. 8 showing the nut 14 and the work piece 60), the key head 46 of the key 16 mates with and engages the recess 28 of the pin member 12 to prevent rotation of the pin member 12 as the nut 14 is torqued on by a driver (not shown in the Figures). In an embodiment, the key 16 may be attached to a power tool, or may be used for manual installation. In an embodiment, the splines 48 and grooves 50 of the key 16 engage the corresponding recesses 34 and splines 32 of the recess 28 of the pin member 12, respectively. In an embodiment, when the key 16 engages the recess 28 and is turned/torqued, each of the first bearing surfaces 52 of the splines 48 of the key 16 contacts a corresponding one of the first bearing surfaces 36 of the splines 32 of the recess 28 of the pin member 12 (see FIG. 7). In an embodiment, the length L of each of the first bearing surfaces 36 is of a sufficient length to maintain such contact. In an embodiment, the contact between each of the first bearing surfaces 52 of the splines 48 of the key 16 and the corresponding one of the first bearing surfaces 36 of the splines 32 of the recesses 28 of the pin member 12 is always face-to-face in the preferential (tightening direction), independent of any clearances between the pin member 12 and the key 16 (see FIG. 7). When engaged in this manner, there is a negative angle of contact (angle of attack in the preferential direction), due to Angle A of each of the first bearing surfaces 52 of each of the splines 48. Furthermore, when the key 16 engages the recess 28 and torque is applied, the radial component of the contact force is directed inwardly (the key 16 pulls the recess 28 inwardly), thereby reducing the hoop stresses applied to the recess 28 and eliminating dilation on the pin member 12. This enables the pin member 12 to be made with a thinner wall, as well as accommodate higher torques. Also, the bearing strength of the key 16 is increased, which promotes a higher useful life thereof. In addition, bearing distortion on the recess 28 is alleviated, thereby improving torque capability.

Figure 9:
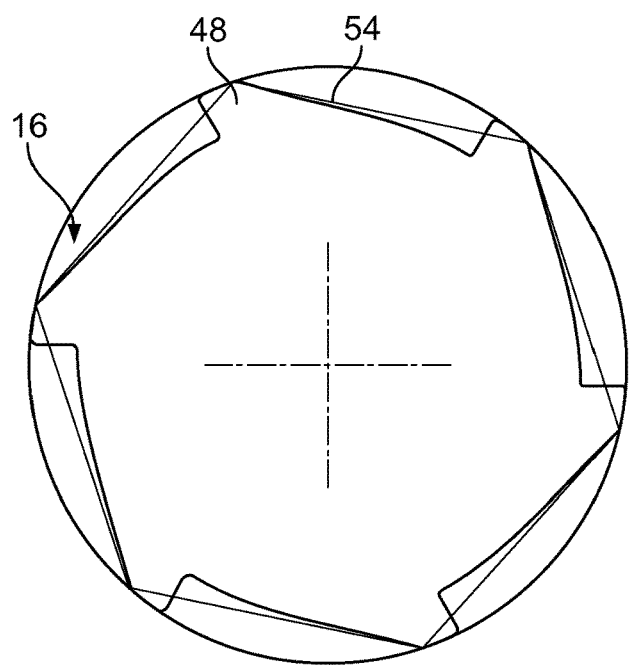
FIG. 9 is a standard hex configuration superimposed over a asymmetric recess configuration.

When torque is applied in the non-preferential direction (loosening or reverse direction), each of the second bearing surfaces 54 of the splines 48 of the key 16 contact and engage a corresponding one of the second bearing surfaces 38 of the splines 32 of the recess 28 of the pin member 12. In an embodiment, such contact can be configured to match polygonal configurations, such as a hex for a six lobe key, as shown in FIG. 9, or as a double square for an eight lobe key.

In other embodiments, the recess 28 of the pin member 12 and the key 16 can each include other numbers of asymmetric splines 32, 48, respectively, such as 5, 7, 8 (to be described below), 12, etc.

FIGS. 10 through 13 show an embodiment of a pin member 112 and an embodiment of a key 116. Elements shown in FIGS. 10 through 13 which correspond, either identically or substantially, to the elements described above with respect to the embodiment shown in FIGS. 1 through 9 have been designated by corresponding reference numerals increased by one hundred, respectively. Unless otherwise stated, the embodiment shown in FIGS. 10 through 13 is structured and functions in the same manner as the embodiment shown in FIGS. 1 through 9.

Figure 10:
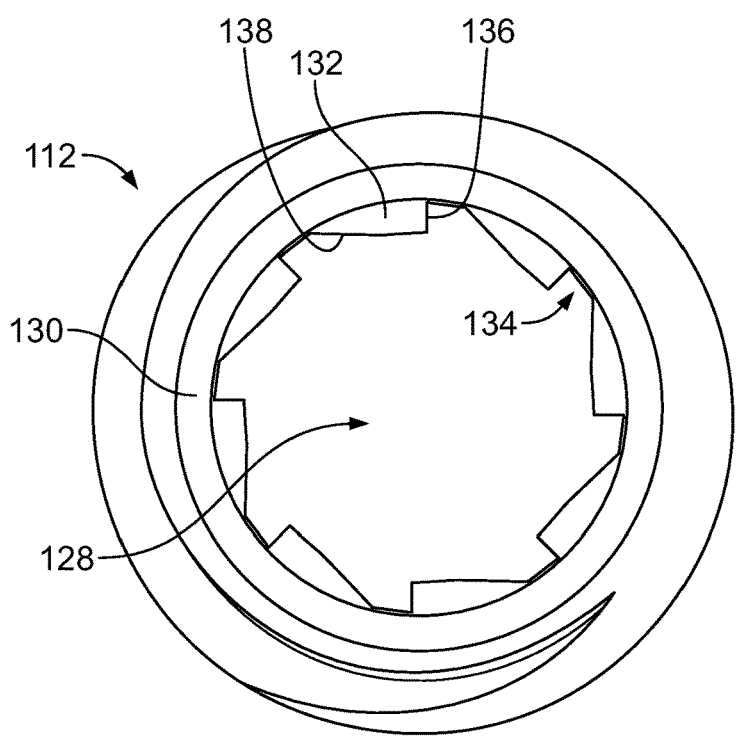
FIG. 10 is a bottom plan view of another embodiment of a pin member.

Referring to FIG. 10, in an embodiment, the pin member 112 includes a recess 128 on an end face 130 and is defined by a plurality of splines 132 positioned circumferentially and equally spaced about a periphery thereof and extending inwardly, and a plurality of recesses 134 formed circumferentially and equally spaced about the periphery thereof. In an embodiment, the plurality of splines 132 includes eight (8) of the splines, while the plurality of recesses 134 includes eight (8) of the recesses. In an embodiment, each of the splines 132 includes a first bearing surface 136 (sometimes referred to as a "contact flank" or "contact area") and a second bearing surface 138. In an embodiment, the first bearing surface 136 and the second bearing surface 138 of each of the splines 132 are substantially perpendicular to one another. In an embodiment, the recess 128 is sized and shaped to match that of the geometry of an end of the key 116, which will be described in detail below.

Figure 11:
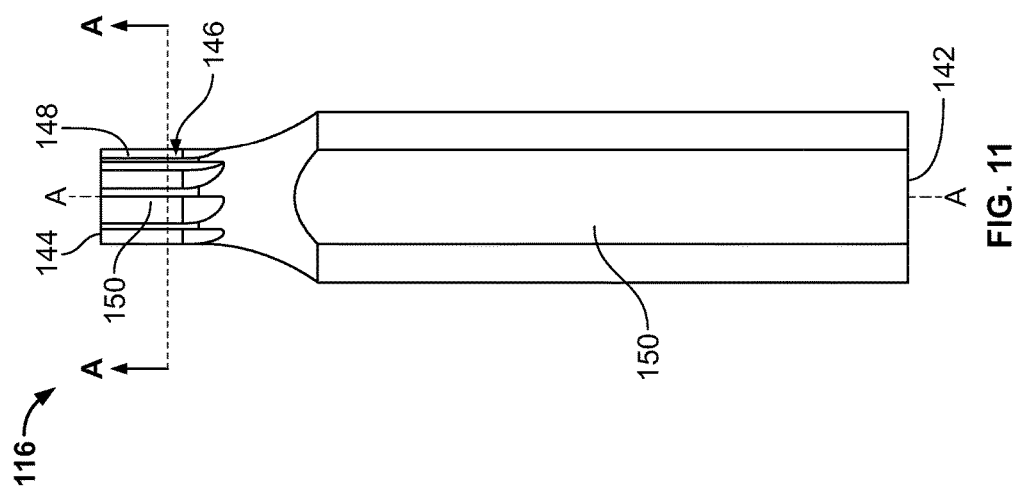
FIG. 11 is a side elevational view of another embodiment of a fastener key.

Referring to FIG. 11, in an embodiment, the key 116 includes an elongated shaft 140 having a first end 142, a second end 144 opposite the first end 142, and a frusto-conical-shaped key head 146 located at the second end 144 of the shaft 140. In an embodiment, the key head 146 includes a plurality of splines 148 extending axially thereon and equally spaced around the circumference thereof, and a plurality of grooves 150 extending axially thereon and equally spaced around the circumference thereof, each of which is positioned intermediate two of the splines 148. In an embodiment, the splines 148 and the grooves 150 are parallel to the longitudinal axis A-A of the shaft 140. In an embodiment, the plurality of splines 148 includes eight (8) of the splines 148, while the plurality of grooves includes eight (8) of the grooves 150.

Figure 12:
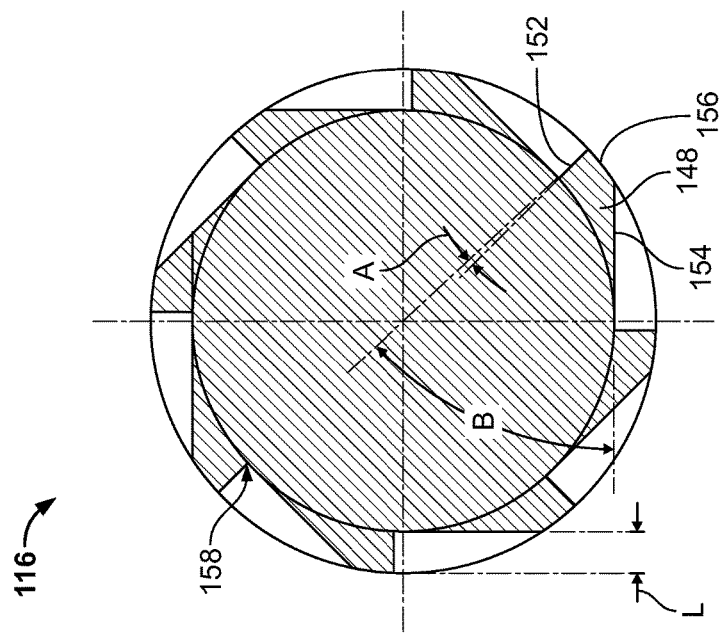
FIG. 12 is a cross-sectional view, taken along line A-A and looking in the direction of the arrows, of the fastener key shown in FIG. 11.

Referring to FIG. 12, in an embodiment, each of the splines 148 includes a first bearing surface 152 (or contact flank), a second bearing surface 154, and an outer face 156 which forms a portion of the major outer diameter of the key 116. In an embodiment, the first bearing surface 152 includes a length L. In an embodiment, the first bearing surface 152 of one of the splines 148 and the second bearing surface 154 of another of the splines 148 positioned proximate and counterclockwise thereto (as shown in FIG. 12) are perpendicular to one another. In an embodiment, the first bearing surface 152 of one of the splines 148 and the second bearing surface 154 of another of the splines 148 positioned proximate and counterclockwise thereto (as shown in FIG. 12) are contiguous by a radiused portion 158.

In an embodiment, the first bearing surface 152 of each of the splines 148 is oriented at an Angle A. Angle A of each of the first bearing surfaces 152 is measured as that of Angle A of the first bearing surfaces 152 of the key 116, as described above. In an embodiment, Angle A of each of the first bearing surfaces 152 is within a range of about 1° to about 5°. In another embodiment, Angle A is about 1°. In another embodiment, Angle A is about 1.5°. In another embodiment, Angle A is about 1.6°. In another embodiment, Angle A is about 1.7°. In another embodiment, Angle A is about 1.8°. In another embodiment, Angle A is about 1.9°. In another embodiment, Angle A is about 2.0°. In another embodiment, Angle A is about 2.1°. In another embodiment, Angle A is about 2.2°. In another embodiment, Angle A is about 2.3°. In another embodiment, Angle A is about 2.4°. In another embodiment, Angle A is about 2.5°. In another embodiment, Angle A is about 2.6°. In another embodiment, Angle A is about 2.7°. In another embodiment, Angle A is about 2.8°. In another embodiment, Angle A is about 2.9°. In another embodiment, Angle A is about 3.0°.

In an embodiment, the second bearing surfaces 154 of each of the splines 148 is oriented at an Angle B, and is measured in the same manner as that of Angle B of the each of the second bearing surfaces 54 of the key 16, as described above. In an embodiment, Angle B is within a range of about 40° to about 50°. In another embodiment, Angle B is about 40°. In another embodiment, Angle B is about 40.5°. In another embodiment, Angle B is about 41°. In another embodiment, Angle B is about 41.5°. In another embodiment, Angle B is about 42°. In another embodiment, Angle B is about 42.5°. In another embodiment, Angle B is about 43°. In another embodiment, Angle B is about 43.5°. In another embodiment, Angle B is about 44°. In another embodiment, Angle B is about 44.5°. In another embodiment, Angle B is about 45°. In another embodiment, Angle B is about 45.5°. In another embodiment, Angle B is about 46°. In another embodiment, Angle B is about 46.5°. In another embodiment, Angle B is about 47°. In another embodiment, Angle B is about 47.5°. In another embodiment, Angle B is about 48°. In another embodiment, Angle B is about 48.5°. In another embodiment, Angle B is about 49°. In another embodiment, Angle B is about 49.5°. In another embodiment, Angle B is about 50°.

Figure 13:
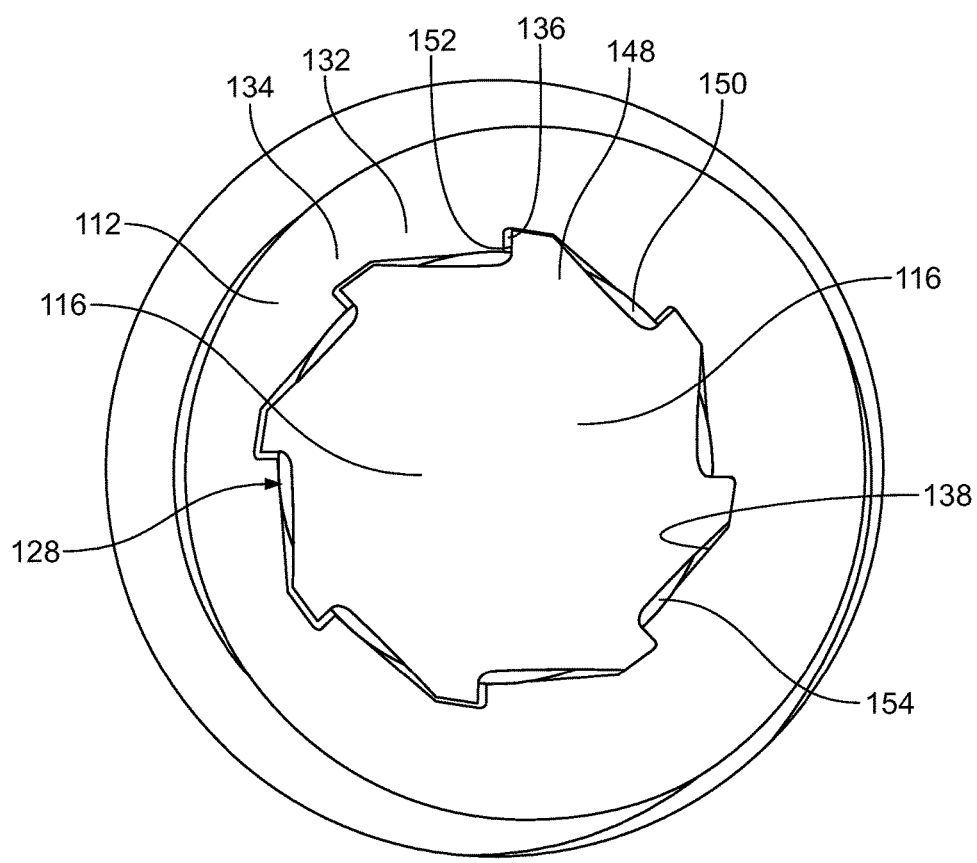
FIG. 13 is a bottom plan view of the pin member shown in FIG. 10 with a cross-section of the fastener key shown in FIGS. 11 and 12 engaging the pin member.

Referring to FIG. 13, in an embodiment, when the pin member 112 is set (the nut not being shown), the recess 128 of the pin member 112 receives and engages the key 116 to prevent rotation of the pin member 112 as a nut is torqued on by a driver (not shown in FIG. 13). In an embodiment, the key 116 may be attached to a power tool, or may be used for manual installation. In an embodiment, the splines 148 and grooves 150 of the key 116 engage the corresponding recesses 134 and splines 132 of the recess 128 of the pin member 112. In an embodiment, when the key 116 engages the recess 128 and is turned/torqued, each of the first bearing surfaces 152 of the splines 148 of the key 116 contact a corresponding one of the first bearing surfaces 136 of the splines 132 of the recess 128 of the pin member 112. In an embodiment, the length L of each of the first bearing surfaces 136 is of a sufficient length to maintain such contact. In an embodiment, the contact between each of the first bearing surfaces 152 of the splines 148 of the key 116 and the corresponding one of the first bearing surfaces 136 of the splines 132 of the recesses 128 of the pin member 112 is always face-to-face in the preferential direction (tightening direction), independent of any clearances between the pin member 112 and the key 116. When engaged in this manner, there is a negative angle of contact (angle of attack in the preferential direction). Furthermore, when the key 116 engages the recess 128 and torque is applied, the radial component of the contact force is directed inwardly (the key 116 pulls the recess 128 inwardly), thereby reducing the hoop stresses applied to the recess 128 and eliminating dilation on the pin member 112.

When torque is applied in the non-preferential direction (loosening or reverse direction), each of the second bearing surfaces 154 of the splines 148 of the key 116 contact and engage a corresponding one of the second bearing surfaces 138 of the splines 132 of the recess 128 of the pin member 112. In an embodiment, such contact can be configured to match polygonal configurations, such as a hex for a six lobe key or as a double square for an eight lobe key.

It should be understood that the embodiments described herein are merely exemplary and that a person skilled in the art may make many variations and modifications without departing from the spirit and scope of the invention. All such variations and modifications are intended to be included within the scope of the invention as defined in the appended claims.

What is claimed is:
1. A fastening system, comprising:
a pin member including an elongated shank portion having a first end, a second end opposite the first end, and an end face located at the second end and having a recess formed therein,
wherein the recess includes a plurality of splines extending axially and positioned circumferentially about a periphery thereof and extending inwardly, wherein each of the plurality of splines includes a first bearing surface and a second bearing surface,
wherein the recess includes a plurality of recesses extending axially and formed circumferentially about the periphery, each of the plurality of recesses being located between a corresponding pair of the plurality of splines,
wherein each of the first bearing surfaces of each of the plurality of splines of the recess is oriented at a first angle extending and measured from a radial line that extends from a center point along a longitudinal axis of the elongated shank portion of the pin member to a first point on such first bearing surface located proximate to a minor inner diameter of such spline of the pin member in a rotational direction towards the second bearing surface of such spline, the first angle being within a range of about 1° to about 5°,
wherein each of the second bearing surfaces of each of the plurality of splines is oriented at a second angle extending and measured from the radial line in a rotational direction opposite the first bearing surface of such spline towards such second bearing surface of such spline, wherein the second angle is greater than the first angle; and
a key including an elongated shaft having a first end and a second end opposite the first end of the elongated shaft, and a key head located at the second end of the elongated shaft,
wherein the key head includes a plurality of splines extending axially thereon, each of the plurality of splines of the key head having a first bearing surface and a second bearing surface, and wherein the key head includes a plurality of grooves extending axially thereon, each of the plurality of grooves being located between a corresponding pair of the plurality of splines of the key head, wherein each of the first bearing surfaces of each of the plurality of splines of the key head is oriented at a third angle extending and measured from a radial line that extends from a center point along a longitudinal axis of the key to a first point on such first bearing surface of such spline of the key head located proximate to a major outer diameter of such spline of the key head in a rotational direction towards the second bearing surface of such spline of the key head, the third angle being within a range of about 1° to about 5°, wherein each of the second bearing surfaces of each of the plurality of splines of the key head is oriented at a fourth angle extending and measured from the radial line of the key head in a rotational direction opposite the first bearing surface of such spline and towards such second bearing surface of such spline of the key head wherein the fourth angle is greater than the third angle, and wherein the key head of the key is adapted to mate with the recess of the pin member such that each of the first bearing surfaces of each of the plurality of splines of the key head is sized and shaped to engage the first bearing surface of a corresponding one of the plurality of splines of the pin member, and each of the second bearing surfaces of each of the plurality of splines of the key head is sized and shaped to engage the second bearing surface of a corresponding one of the plurality of splines of the pin member.

2. The fastening system of claim 1, wherein the plurality of splines of the pin member includes six of the splines and wherein the plurality of recesses of the pin member includes six of the recesses, and wherein the plurality of splines of the key includes six of the splines and the plurality of grooves of the key includes six of the grooves.

3. The fastening system of claim 1, wherein the second angle and the fourth angle are each within a range of about 30° to about 35°.

4. The fastening system of claim 1, wherein the plurality of splines of the pin member includes eight of the splines and wherein the plurality of recesses of the pin member includes eight of the recesses, and wherein the plurality of splines of the key includes eight of the splines and the plurality of grooves of the key includes eight of the grooves.

5. The fastening system of claim 1, wherein the second angle and the fourth angle are each within a range of about 40" to about 50°.

6. The fastening system of claim 1, wherein a corresponding pair of the first bearing surface and the second bearing surface of each of the plurality of splines of the pin member are perpendicular to one another, and wherein a corresponding pair of the first bearing surface and the second bearing surface of each of the plurality of splines of the key are perpendicular to one another.

7. The fastening system of claim 1, further comprising a nut, and wherein the elongated shank portion of the pin member includes a threaded portion located at the second end thereof and having a plurality of external threads, and wherein the nut is adapted to engage threadedly the threaded portion of the pin member.

8. The fastening system of claim 7, wherein the nut includes a centrally-located bore that is sized and shaped to receive the key therethrough.

9. A fastening system, comprising:
a pin member including an elongated shank portion having a first end, a second end opposite the first end, and a head located at the first end and having a recess formed therein, wherein the recess includes a plurality of splines extending axially and positioned circumferentially about a periphery thereof and extending inwardly, wherein each of the plurality of splines includes a first bearing surface and a second bearing surface, wherein the recess includes a plurality of recesses extending axially and formed circumferentially about the periphery, each of the plurality of recesses being located between a corresponding pair of the plurality of splines, wherein each of the first bearing surfaces of each of the plurality of splines of the recess is oriented at a first angle extending and measured from a radial line that extends from a center point along a longitudinal axis of the elongated shank portion of the pin member to a first point on such first bearing surface located proximate to a minor inner diameter of such spline of the pin member in a rotational direction towards the second bearing surface of such spline, the first angle being within a range of about 1° to about 5°, wherein each of the second bearing surfaces of each of the plurality of splines is oriented at a second angle extending and measured from the radial line in a rotational direction opposite the first bearing surface of such spline and towards such second bearing surface of such spline wherein the second angle is greater than the first angle; and a key including an elongated shaft having a first end, and a second end opposite the first end of the elongated shaft, and a key head located at the second end of the elongated shaft, wherein the key head includes a plurality of splines extending axially thereon, each of the plurality of splines of the key head having a first bearing surface and a second bearing surface, and wherein the key head includes a plurality of grooves extending axially thereon, each of the plurality of grooves being located between a corresponding pair of the plurality of splines of the key head, wherein each of the first bearing surfaces of each of the plurality of splines of the key head is oriented at a third angle extending and measured from a radial line that extends from a center point along a longitudinal axis of the key to a first point on such first bearing surface of such spline of the key head located proximate to a major outer diameter of such spline of the key head in a rotational direction towards the second bearing surface of such spline of the key head, the third angle being within a range of about 1° to about 5°, wherein each of the second bearing surfaces of each of the plurality of splines of the key head is oriented at a fourth angle extending and measured from the radial line of the key head in a rotational direction opposite the first bearing surface of such spline and towards such second bearing surface of such spline of the key head wherein the fourth angle is greater than the third angle, and wherein the key head of the key is adapted to mate with the recess of the head of the pin member such that each of the first bearing surfaces of each of the plurality of splines of the key head is sized and shaped to engage the first bearing surface of a corresponding one of the plurality of splines of the pin member, and each of the second bearing surfaces of each of the plurality of splines of the key head is sized and shaped to engage the second bearing surface of a corresponding one of the plurality of splines of the pin member.

10. The fastening system of claim 9, wherein the plurality of splines of the pin member includes six of the splines and wherein the plurality of recesses of the pin member includes six of the recesses, and wherein the plurality of splines of the key includes six of the splines and the plurality of grooves of the key includes six of the grooves.

11. The fastening system of claim 9, wherein the second angle and the fourth angle are each within a range of about 30° to about 35°.

12. The fastening system of claim 11, wherein the plurality of splines of the pin member includes eight of the splines and wherein the plurality of recesses of the pin member includes eight of the recesses, and wherein the plurality of splines of the key includes eight of the splines and the plurality of grooves of the key includes eight of the grooves.

13. The fastening system of claim 9, wherein the second angle and the fourth angle are each within a range of about 40" to about 50°.

14. The fastening system of claim 9, further comprising a nut, and wherein the elongated shank portion of the pin member includes a threaded portion located at the second end thereof and having a plurality of external threads, and wherein the nut is adapted to engage threadedly the threaded portion of the pin member.

15. The fastening system of claim 14, wherein the nut includes a centrally-located bore that is sized and shaped to receive the key therethrough.

16. The fastening system of claim 9, wherein a corresponding pair of the first bearing surface and the second bearing surface of each of the plurality of splines of the pin member are perpendicular to one another, and wherein a corresponding pair of the first bearing surface and the second bearing surface of each of the plurality of splines of the key are perpendicular to one another.

17. A pin member, comprising:
an elongated shank portion having a first end, a second end opposite the first end, and an end face located at the second end and having a recess formed therein,
wherein the recess includes a plurality of splines extending axially and positioned circumferentially about a periphery thereof and extending inwardly, wherein each of the plurality of splines includes a first bearing surface and a second bearing surface,
wherein the recess includes a plurality of recesses extending axially and formed circumferentially about the periphery, each of the plurality of recesses being located between a corresponding pair of the plurality of splines,
wherein each of the first bearing surfaces of each of the plurality of splines of the recess is oriented at a first angle extending and measured from a radial line that extends from a center point along a longitudinal axis of the elongated shank portion to a first point on such first bearing surface located proximate to a minor inner diameter of such spline in a rotational direction towards the second bearing surface of such spline, the first angle being within a range of about 1° to about 5°, and
wherein each of the second bearing surfaces of each of the plurality of splines is oriented at a second angle extending and measured from the radial line in a rotational direction opposite the first bearing surface of such spline and towards such second bearing surface of such spline wherein the second angle is greater than the first angle.

18. The pin member of claim 17, wherein the plurality of splines includes six of the splines and wherein the plurality of recesses includes six of the recesses.

19. The pin member of claim 17, wherein the second angle is within a range of about 30° to about 35°.

20. The pin member of claim 17, wherein the plurality of splines includes eight of the splines and wherein the plurality of recesses includes eight of the recesses.

21. The pin member of claim 17, wherein the second angle is within a range of about 40° to about 50°.

22. The pin member of claim 17, wherein a corresponding pair of the first bearing surface and the second bearing surface of each of the plurality of splines are perpendicular to one another.

23. The pin member of claim 17, wherein the elongated shank portion includes a threaded portion located at the second end thereof and having a plurality of external threads, and wherein a nut is adapted to engage threadedly the threaded portion.

24. A key, comprising:
an elongated shaft having a first end and a second end opposite the first end, and a key head located at the second end,
wherein the key head includes a plurality of splines extending axially thereon, each of the plurality of splines of the key head having a first bearing surface and a second bearing surface, and wherein the key head includes a plurality of grooves extending axially thereon, each of the plurality of grooves being located between a corresponding pair of the plurality of splines,
wherein each of the first bearing surfaces of each of the plurality of splines is oriented at a first angle extending and measured from a radial line that extends from a center point along a longitudinal axis of the key to a first point on such first bearing surface of such spline located proximate to a major outer diameter of such spline in a rotational direction towards the second bearing surface of such spline, the first angle being within a range of about 1° to about 5°, and
wherein each of the second bearing surfaces of each of the plurality of splines is oriented at a second angle extending and measured from the radial line of the key head in a rotational direction opposite the first bearing surface of such spline and towards such second bearing surface of such spline, wherein the second angle is greater than the first angle.

25. The key of claim 24, wherein the plurality of splines includes six of the splines and the plurality of grooves includes six of the grooves.

26. The key of claim 24, wherein the second angle is within a range of about 30° to about 35°.

27. The key of claim 25, wherein the plurality of splines includes eight of the splines and the plurality of grooves includes eight of the grooves.

28. The key of Cam 24, wherein the second angle is within a range of about 40° to about 50°.

29. The key of claim 25, wherein a corresponding pair of the first bearing surface and the second bearing surface of each of the plurality of splines are perpendicular to one another.

30. A pin member, comprising:
an elongated shank portion having a first end, a second end opposite the first end, and a head located at the first end and having a recess formed therein,
wherein the recess includes a plurality of splines extending axially and positioned circumferentially about a periphery thereof and extending inwardly, wherein each of the plurality of splines includes a first bearing surface and a second bearing surface, wherein the recess includes a plurality of recesses extending axially and formed circumferentially about the periphery, each of the plurality of recesses being located between a corresponding pair of the plurality of splines, wherein each of the first bearing surfaces of each of the plurality of splines of the recess is oriented at a first angle extending and measured from a radial line that extends from a center point of a longitudinal axis of the elongated shank portion to a first point on such first bearing surface located proximate to a minor inner diameter of such spline in a rotational direction towards the second bearing surface of such spline, the first angle being within a range of about 1° to about 5°, and wherein each of the second bearing surfaces of each of the plurality of splines is oriented at a second angle extending and measured from the radial line in a rotational direction opposite the first bearing surface of such spline and towards such second bearing surface of such spline, wherein the second angle is greater than the first angle.

31. The pin member of claim 30, wherein the plurality of splines includes six of the splines and wherein the plurality of recesses includes six of the recesses.

32. The pin member of claim 30, wherein the second angle is within a range of about 30° to about 35°.

33. The pin member of claim 30, wherein the plurality of splines includes eight of the splines and wherein the plurality of recesses includes eight of the recesses.

34. The pin member of claim 30, wherein the second angle is within a range of about 40° to about 50°.

35. The pin member of claim 30, wherein a corresponding pair of the first bearing surface and the second bearing surface of each of the plurality of splines are perpendicular to one another.

36. The pin member of claim 30, wherein the elongated shank portion includes a threaded portion located at the second end thereof and having a plurality of external threads, and wherein a nut is adapted to engage threadedly the threaded portion.

* * * * *